United States Patent Office 3,154,597
Patented Oct. 27, 1964

3,154,597
SILOXANE MODIFIED EPOXIDE RESINS
Wayne F. McWhorter, Louisville, Ky., assignor to
Devoe & Raynolds Company, Inc.
No Drawing. Filed Sept. 16, 1955, Ser. No. 534,867
12 Claims. (Cl. 260—824)

This invention relates to novel silicone modified epoxide resins and more particularly to siloxane modified epoxide resins which are prepared by the reaction of alkoxy, aroxy or substituted aroxy polysiloxanes with polyepoxide resins having terminal epoxide groups and intermediate alcoholic hydroxyl groups. The invention includes novel methods for the preparation of such siloxane modified polyepoxide resins, the siloxane modified polyepoxide resins so produced, and compositions containing them or made therefrom.

The new siloxane modified polyepoxide resins are useful as and in coating compositions. They produce hard, tough, flexible, xylol resistant coatings. The new siloxane modified polyepoxide resins also exhibit greatly improved color stability in the presence of heat and improved crawling characteristics over the unmodified polyepoxide resins.

I have found that by subjecting polyepoxide resins with terminal epoxide groups and intermediate alcoholic hydroxyl groups to reaction with alkoxy, aroxy or substituted aroxy polysiloxanes a reaction will take place between the hydroxyl groups of the epoxide resin and the alkoxy, aroxy, or substituted aroxy groups of the polysiloxanes leaving the terminal epoxide groups unreacted, thus forming siloxane modified epoxide resins which contain the free terminal epoxide groups of the epoxide resins. The products of the present invention consist chiefly of an epoxide resin with ether type modifications at its alcoholic hydroxyl groups, which modifications consist of organo polysiloxanes.

The siloxane modified epoxide resins of this invention can be cured with various converters capable of curing the unmodified epoxide resins themselves such as amines, amides, urea-formaldehyde resins, phenol-aldehyde resins, polybasic acids, anhydrides or other converters for the polymerization of epoxy groups. Benzene phosphonic acid and benzene phosphinic acid have been found to be particularly advantageous giving improved curing, and gloss.

The polyepoxide resins used in accordance with the present invention are resins which contain more than one epoxide group and at least one hydroxyl group per molecule. Typical examples are epoxide resins such as those obtained by the reaction of bisphenol with epichlorohydrin or aliphatic diepoxides such as diglycid ether or epoxides obtained by the reaction of epichlorohydrin with polyhydric alcohols, or with polycyclic diepoxide ethers, such as described, for example, in U.S. Patents Nos. 2,582,985, 2,615,007, 2,615,008, 2,592,560 and 2,581,464. Further examples of epoxide resins are those prepared from the reaction of phenol terminated resins which are prepared by the reaction of an excess of dihydric phenol with epichlorohydrin with aliphatic diepoxides, or bisphenol-epichlorohydrin resins could be used.

The polysiloxanes used for reacting with the polyepoxide resins containing hydroxyl groups include alkoxy, aroxy, or substituted aroxy polysiloxanes having the following general formula:

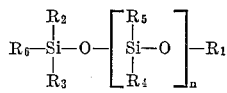

where $n$ is at least 1; $R_1$ is an alkyl, aryl or substituted aryl group; $R_2$ is an alkyl, aryl, or substituted aryl group; $R_3$ is an alkyl, aryl, substituted aryl, alkoxy or aroxy group or hydrogen; $R_4$ is an alkyl, aryl, substituted aryl, alkoxy or aroxy group or hydrogen; $R_5$ is an alkyl, aryl or substituted aryl group and $R_6$ is a member of the group consisting of an alkyl, aryl, alkoxy and aroxy group.

I have found that a methoxy polysiloxane containing an average of 3 methoxy groups per molecule is an advantageous siloxane reactant. A polysiloxane marketed under the trade name "Sylkyd 50" by Dow-Corning Corporation is an example of such a methoxy polysiloxane. "Sylkyd 50" has an average molecular weight of 473, contains an average of 3 methoxy groups per molecule, and an average chemical formula represented by the following structure:

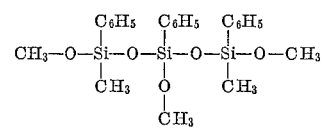

Mixtures of various epoxide resins and polysiloxanes can also be used. A mixture of a high and a low melting epoxide resin has been found to give a particularly useful product and also advantageously lowers the viscosity of the reaction mixture.

Various reacting processes can be used in the preparation of the polysiloxane modified epoxide resins of the invention. For example, the polysiloxane and epoxide resin can be placed in an open vessel and heated to the reaction temperature until the product will form a clear pill on glass. The volatile alcohol formed during the reaction can be allowed to boil off. This process is especially advantageous with low melting epoxide resins. For high melting epoxide resins, it has been found to be advantageous to add a solvent to the reactants to reduce the viscosity of the reaction composition. When a solvent is used, it is advantageous to carry out the reaction in a closed vessel equipped with a thermometer, agitator, and condenser. The volatile alcohol formed during the reaction can be collected in a well attached to the condenser.

The reaction temperature may vary from between about 250° to 350° F. depending upon the process employed and the particular polysiloxane and epoxide resin being reacted. The reaction time may vary from about one half to nine hours or longer depending upon the temperature, the reactants, and the proportions of the reactants used.

The polysiloxone compounds can be reacted with the epoxide resins in accordance with this invention in various proportions depending upon the type of product desired. The maximum amount of alkoxy or aroxy polysiloxane which can be used to completely modify the polyepoxide would depend upon the number of hydroxyl groups per molecule. For example, an epoxide resin containing 15 hydroxyl groups per molecule and having a molecular weight of approximately 3750 would require 65.4% by weight of an alkoxy polysiloxane having an average of 3 alkoxy groups per molecule such as "Sylkyd 50" and 34.6% by weight of the polyepoxide.

The invention is further illustrated by the following specific examples, but it is to be understood that the invention is not limited thereto. The parts are by weight.

The epoxide resins referred to in the examples are resins made by the reaction of bis-phenol and epichlorhydrin in the presence of caustic alkali or by reacting a low melting point epoxide resin with a small amount of bis-phenol to form a higher melting point epoxide resin.

The polysiloxane referred to in the examples as "Sylkyd 50" is the product of Dow-Corning Corporation above referred to and is a methoxy polysiloxane having an average molecular weight of 473 and containing an average of 3 methoxy groups per molecule.

The method used for determining the epoxide content of the epoxide resins was by heating one gram sample of the epoxide composition with an excess of pyridine containing hydrochloride (made by adding 16 cc. of concentrated hydrochloric acid per liter pyridine) at the boiling point for 20 minutes and back titrating the excess pyridine hydrochloride with 0.1 N sodium hydroxide using phenolphthalein as indicator, and considering that 1 HCl is equivalent to one epoxide group.

The Parr bomb method was used for an analysis of the silicon content.

The term "catalyst" as used in some of the following examples (13 and 15) refers to a styreneacrylic acid copolymer prepared by the reaction of 87.8 parts styrene and 12.2 parts acrylic acid. The copolymer as used in the examples is a 45.6% solids solution in xylene methyl isobutyl ketone before dilution with the cyclohexanone.

*Example 1*

In a one-half liter, three necked round bottom flask, equipped with a thermometer, stirrer and heated reflux condenser was placed 192 parts of an epoxide resin, having a molecular weight of approximately 2900, an average weight per epoxide of 2000, and containing approximately 10.7 hydroxyl groups per molecule, 8 parts (4% by weight) "Sylkyd 50," 110 parts cyclohexanone and enough naphtha to hold the reaction mixture at the desired reflux temperature. The reaction mixture was heated to 320° F. with the condenser at 230°–240° F. and held for 40 minutes. The methyl alcohol by-product and some solvent were allowed to escape through the top of the condenser. At the end of the cooking period, the reaction mixture formed a clear pill on glass. The resulting product was a very viscous liquid. The reaction mixture was allowed to cool and then reduced further with additional cyclohexanone. A film of the product was drawn on glass and baked 30 minutes at 400° F. This film showed no signs of crawling and had excellent flexibility and color retention.

*Example 2*

In a one liter, three necked, round bottom flask equipped with stirrer, thermometer and condenser, was placed 332.5 parts of an epoxide resin, having a molecular weight of approximately 527, an average weight per epoxide of 338, and containing approximately 2.12 hydroxyl groups per molecule. The resin was heated to 250° F. and 17.5 parts (5% by weight) "Sylkyd 50" added. The reaction mixture was heated at 290° F. for ½ hour until the product would form a clear pill on glass. The reaction mixture was allowed to cool and then thinned to 39.0% solids with a solvent mixture of 60% methyl isobutyl ketone and 40% xylol. The reaction product had a viscosity of $A_4$ at 39% solids.

A 3 mil film of a 39% solution of the above resin product was drawn on glass and baked 1 hour at 230° C. This film showed very good hardness and color retention.

7.1% (based on resin solids) tetraethylene pentamine was added to a 39% solution of the above resin product. A 3 mil film was drawn on glass and baked 30 minutes at 150° C. This film showed very good hardness, toughness and flexibility. A similar film allowed to air dry for two days also showed very good hardness and flexibility.

5.5% (based on resin solids) diethylene triamine was added to a 39% solution of the above resin product. A 3 mil film was drawn on glass and baked 30 minutes at 150° C. This film showed excellent hardness, toughness, flexibility and xylol resistance. A similar film allowed to air dry for two days showed very good hardness and flexibility.

15% (based on resin solids) urea formaldehyde resin marketed by American Cyanamid Company under the trade name Beetle 216-8 was added to a 39% solution of the above resin product. A 3 mil film was drawn on glass and baked 30 minutes at 200° C. This film showed very good hardness and color retention.

*Example 3*

In a one liter, three necked flask equipped with thermometer, agitator and condenser was placed 315 parts of an epoxide resin, having a molecular weight of approximately 527, an average weight per epoxide of 338, and containing about 2.12 hydroxyl groups per molecule. The resin was heated to 250° F. and 35 parts (10%) "Sylkyd 50" added. The reaction mixture was heated at 290° F. for 1 hour until the product would form a clear pill on glass. The reaction product was cooled and reduced to 50% solids with a solvent mixture consisting of 40.3% methyl isobutyl ketone, 26.8% xylol and 32.9% cyclohexanone. The reaction product had a viscosity of D at 50% solids. Analysis of the product showed that it contained 1.76% silicon. The theoretical silicon content for this product is 1.78%.

A 3 mil film of a 50% solution of the above resin product was drawn on glass and baked 1 hour at 230° C. This film showed very good hardness, toughness, flexibility and color retention.

6.7% (based on resin solids) tetraethylene pentamine was added to a 50% solution of the above resin product. A 3 mil film was drawn on glass and baked 30 minutes at 150° C. This film showed very good hardness, toughness, flexibility and xylol resistance. A similar film allowed to air dry for two days also showed very good toughness and flexibility.

5.2% (based on resin solids) diethylene triamine was added to a 50% solution of the above resin product. A 3 mil film was drawn on glass and baked 30 minutes at 150° C. This film showed very good hardness, toughness, flexibility and xylol resistance. A similar film allowed to air dry for two days also showed very good toughness and flexibility.

15% (based on resin solids) urea formaldehyde resin (Beetle 216-8, American Cyanamid Company) was added to a 50% solution of the above resin product. A 3 mil film was drawn on glass and baked 30 minutes at 150° C. This film showed excellent hardness and color retention.

*Example 4*

In a 2 liter flask equipped with thermometer, stirrer and sidearm with well and condenser was placed 860 parts of an epoxide resin, having a molecular weight of approximately 1400, an average weight per epoxide of 897, and containing approximately 4.88 hydroxyl groups per molecule. 265 parts cyclohexanone was added and the mixture heated. When the solution temperature reached 260° F., 97 parts (9.7% by weight) "Sylkyd 50" was added. Heating was continued in an atmosphere of $CO_2$. The temperature was held at 289°–292° F. for 5 hours and 40 minutes, at which time the reaction product would form a clear pill on glass. The reaction product was allowed to cool and reduced to 31.5% solids with cyclohexanone. Analysis of this product showed that it had a weight per epoxide of 943–1065. The theoretical weight per epoxide for this product is 959.

*Example 5*

In a one liter flask equipped with thermometer, stirrer, and reflux condenser was placed 135 parts of an epoxide resin, having a molecular weight of approximately 2900, an average weight per epoxide of 2000, and containing approximately 10.7 hydroxyl groups per molecule, 15 parts (10%) "Sylkyd 50," 80 parts cyclohexanone and enough naphtha to hold the condenser vapor temperature at 200° F. When the reaction temperature had been held at 290° F. for 10 minutes, 40 parts additional cyclohexanone was added. The reaction mixture was further heated at 290° F. for 2 hours. The reaction product was cooled and reduced with solvent. The reaction product had a silicon content of 1.54%. The theoretical silicon content for this product is 1.78%.

A film of the above product with 3%, based on solids, urea formaldehyde resin (Beetle 216–8, American Cyanamid Company) was drawn on glass and baked. This film had excellent hardness, mar-proofness and flexibility.

*Example 6*

In a one liter, three neck flask equipped with thermometer, stirrer and reflux condenser was placed 346 parts of an epoxide resin, having a molecular weight of approximately 888, an average weight per epoxide of 500, and containing approximately 3.11 hydroxyl groups per molecule. When the resin temperature reached 248° F., 300 parts hi flash naphtha, 100 parts diethyl carbitol, and 54 parts (13.5%) "Sylkyd 50" were added at 5 minute intervals. The reaction mixture was then heated with refluxing from 298° F. to 339° F. over a period of 3 hours until the product formed a clear pill on glass. The reaction product was a clear, thin liquid containing approximately 50% solvent.

*Example 7*

In a one liter, three neck flask equipped with thermometer, stirrer and reflux condenser was placed 301 parts of an epoxide resin, having a molecular weight of approximately 527, an average weight per epoxide of 338, and containing about 2.12 hydroxyl groups per molecule. When the resin had been heated to 240° F., 49 g. (14%) "Sylkyd 50" was added and the reaction mixture heated to 290° F. in 3 hours until the product would form a clear pill on glass. The reaction product was allowed to cool and reduced to 37.8% solids. A clear product was obtained. Before cooking, the above mixture was incompatible.

*Example 8*

In a one liter three necked flask equipped with thermometer, agitator, and condenser was placed 280 parts of an epoxide resin, having a molecular weight of approximately 527, an average weight per epoxide of 338, and containing about 2.12 hydroxyl groups per molecule. The resin was heated to 260° F. and 70 parts (20%) "Sylkyd 50" added. The reaction mixture was heated at 290° F. for 3½ hours until the product would form a clear pill on glass. The reaction product was cooled and reduced to 44.8% solids with a solvent mixture of 24.4% methyl isobutyl ketone, 16.4% xylol and 59.2% cyclohexanone. The reaction product had a viscosity of E at 44.8% solids. Analysis of product showed it contained 3.69% silicon. Theoretical silicon content for this product is 3.56%.

A 3 mil film of a 44.8% solution of the above resin product was drawn on glass and baked 1 hour at 230° C. This film showed very good hardness, toughness, flexibility and color retention.

6% (based on resin solids) tetraetylene pentamine was added to a 44.8% solution of the above resin product. A 3 mil film was drawn on glass and baked 30 minutes at 150° C. This film showed very good hardness, toughness, flexibility and xylol resistance. A similar film allowed to air dry for 2 days showed very good toughness and flexibility.

4.6% (based on resin solids) diethylene triamine was added to a 44.8% solution of the above resin product. A 3 mil film was drawn on glass and baked 30 minutes at 150° C. This film showed very good hardness, toughness, flexibility and xylol resistance. A similar film allowed to air dry for two days also showed very good flexibility.

15% (based on resin solids) urea formaldehyde resin (Beetle 216–8, American Cyanamid Company) was added to a 44.8% solution of the above resin product. A 3 mil film was drawn on glass and baked 30 minutes at 200° C. This film showed very good hardness, toughness, flexibility and color retention.

*Example 9*

In a one liter, three necked flask equipped with thermometer, stirrer, and reflux condenser was placed 200 parts of an epoxide resin, having a molecular weight of approximately 791, an average weight per epoxide of 592, and containing about 3.39 hydroxyl groups per molecule, 50 parts (20%) "Sylkyd 50," 80 parts cyclohexanone, and 25 parts naphtha. The reaction mixture was heated at 290° F. for 3½ hours until the reaction product would form a clear pill on glass. Before cooking this composition was incompatible. The reaction mixture was cooled and reduced to 45.2% solids with a solvent mixture of 95% cyclohexanone and 5% lacquer diluent naphtha. The reaction product had a viscosity of B–C.

A 3 mil film of a 45.2% solution of the above resin product was drawn on glass and baked 1 hour at 230° C. This film showed excellent hardness, toughness, flexibility and color retention.

3.8% (based on resin solids) tetraethylene pentamine was added to a 45.2% solution of the above resin product. A 3 mil film was drawn on glass and baked 30 minutes at 150° C. This film showed very good hardness, toughness and flexibility. A similar film allowed to air dry for two days also showed very good flexibility.

2.9% (based on resin solids) diethylene triamine was added to a 45.2% solution of the above resin product. A 3 mil film was drawn on glass and baked 30 minutes at 150° C. This film showed very good hardness, toughness, and flexibility. A similar film was allowed to air dry for two days. This film also showed very good flexibility.

15% (based on resin solids) urea formaldehyde resin (Beetle 216–8, American Cyanamid Company) was added to a 45.2% solution of the above resin product. A 3 mil film was drawn on glass and baked 30 minutes at 200° C. This film showed very good hardness, toughness and color retention.

*Example 10*

In an open three liter kettle equipped with thermometer and agitator was placed 1500 parts of an epoxide resin, having a molecular weight of approximately 1400, an average weight per epoxide of 897, and containing about 4.88 hydroxyl groups per molecule, and 439 parts (20%) "Sylkyd 50." The reaction mixture was heated for one hour at 290°–300° F. The reaction product had a melting point of 82° C. and a weight per epoxide of 1250.

A 40% solution of the product in butyl carbitol had a viscosity of R–S and a color of 4.

A film of the above product drawn on glass and baked 10 minutes at 450° F. showed excellent flexibility and good color retention.

A film of the above product and 2% (based on solids) benzene phosphonic acid drawn on glass and baked 10 minutes at 450° F. gave improved gloss and a better cure than the above film. A flexible film was obtained.

*Example 11*

In a 2½ gallon kettle equipped with a thermometer, stirrer and condenser was placed 2935 parts water, 291 parts technical sodium hydroxide, 3 parts sodium orthosilicate and 1195 parts bisphenol. 589 parts epichlorohydrin was added and the reaction mixture was heated to 200° F. The reaction mixture was held at 200°–205° F. for 1 hour and then washed with water until the solution was neutral to litmus. As much water as possible was drained off and the reaction product dried by heating to 300° F. After this heating period was completed 439 parts "Sylkyd 50" was added to the product and the mixture heated for one hour to give a clear, ungelled product.

*Example 12*

In a 5 liter, three necked, round bottom flask equipped with thermometer, stirrer, and condenser was placed 1280 parts of an epoxide resin, having a molecular weight of approximately 3750, an average weight per epoxide of 2780 and containing an average of 15 hydroxyl groups per mol, 320 parts (20%) "Sylkyd 50" and 1600 parts Cellosolve acetate. The reaction mixture was heated 1½ hours at 296°–304° F., cooled and reduced to 40% solids with Cellosolve acetate and run through filter press.

The reaction product had a silicone content of 3.01%, and viscosity of Y–Z and color of 7 at 40% non-volatile.

A sample of the above reaction product was flowed out on bonderized steel and baked 30 minutes at 425° F. A hard, flexible, film was obtained. This product showed good color retention.

*Example 13*

The apparatus used was a two liter three necked flask equipped with agitator, thermometer and Vigreux column attached to downward condenser and suction flask in Dry Ice-acetone bath connected to a trap in a second Dry Ice-acetone bath. 280 parts of an epoxide resin, having a molecular weight of approximately 466, an average weight per epoxide of 245, and containing an average of about 0.796 hydroxyl groups per molecule, was placed in the flask and heated to 200° F. 4 parts of the "Catalyst" above referred to in 6 parts cyclohexanone and 120 parts (30%) "Sylkyd 50" were added. The reaction mixture was heated to 290° F. in an atmosphere of $CO_2$ for 8 hours and 30 minutes. 9.8 parts crude distillate was collected. The reaction product was cooled and reduced to 55% solids with xylol. The reaction product had a viscosity of $A_3$ at 55% solids and a weight per epoxide of 315.

A 3 mil film of a 55% xylol solution of the above product was drawn on glass and baked 1 hour at 230° C. This film exhibited very good hardness, toughness, flexibility and color retention.

8.4% (based on resin solids) tetraethylene pentamine was added to a 55% solution of the above resin product. A 3 mil film was drawn on glass and baked 30 minutes at 150° C. This film showed very good flexibility, hardness, toughness and xylol resistance. A similar film allowed to air dry for two days was hard, tough, and flexible.

6.5% (based on resin solids) diethylene triamine was added to a 55% solution of the above resin product. A 3 mil film was drawn on glass and baked 30 minutes at 150° C. This film showed very good flexibility, hardness, toughness, and xylol resistance. A similar film allowed to air dry for two days showed very good hardness.

15% (based on resin solids) urea-formaldehyde resin (Beetle 216–8, American Cyanamid Company) was added to a 55% solution of the above resin product. This film showed good hardness and color retention.

*Example 14*

In a two liter three necked flask equipped with thermometer, stirrer and fractionating column as in Example 13 was placed 560 parts of an epoxide resin, having a molecular weight of approximately 613, an average weight per epoxide of 321, and containing about 1.95 hydroxyl groups per molecule. The resin was heated in an atmosphere of $CO_2$ to 290° F. and 240 parts (30%) "Sylkyd 50" added. The reaction mixture was heated at 290° F. in an atmosphere of $CO_2$ for 5¾ hours until the reaction product would form a clear pill on glass. 26 cc of distillate was recovered. The reaction product was cooled and reduced to 60% solids with cyclohexanone. The reaction product had a weight per epoxide of 462. Theoretical weight per epoxide for this product is 446.

*Example 15*

In a two liter three necked flask equipped with thermometer, stirrer and fractionating column as in Example 13 was placed 280 parts of an epoxide resin, having a molecular weight of 527, an average weight per epoxide of 338, and containing about 2.12 hydroxyl groups per molecule. The resin was melted and 4 parts of the "Catalyst" above referred to in 10 parts cyclohexanone mixed with it. 120 parts (30%) "Sylkyd 50" were added and the reaction mixture heated to 290° F. in an atmosphere of $CO_2$. The reaction mixture was cooked in an atmosphere of $CO_2$ at 288°–290° F. for 8½ hours. 16.7 parts distillate were recovered. The reaction product was cooled and reduced to 59% solids with xylol. The reaction product had a weight per epoxide of 456–483. Theoretical weight per epoxide for this product is 448. Analysis of the product showed it contained 5.39% silicon. Theoretical silicon for this product equaled 5.34%.

*Example 16*

In a one liter flask equipped with thermometer, stirrer and reflux condenser was placed 215 parts of an epoxide resin, having a molecular weight of approximately 1400, an average weight per epoxide of 897, and containing about 4.88 hydroxyl groups per molecule, 175 parts hi-flash naphtha and 175 parts diethylene glycol diethyl ether, marketed under the trade name Diethyl Carbitol by Carbide and Carbon Chemicals Company. This mixture was heated to 230° F. and 185 parts (46%) "Sylkyd 50" added. The reaction mixture was heated 2¼ hours while the reaction temperature rose from 230° F. to 344° F. At this point the reaction product would form a clear pill on glass. The reaction product was cooled and reduced to 42.4% solids with a solvent mixture of 34.8% hi-flash naphtha, 34.8% diethyl carbitol, and 30.4% cyclohexanone. Analysis of the product showed that it contained 8.34% silicon.

A 3 mil film of a 42.4% solution of the above resin product was drawn on glass and baked 1 hour at 230° C. This film showed very good hardness, toughness, flexibility and color retention.

1.6% (based on resin solids) tetraethylene pentamine was added to a 42.4% solution of the above resin product. A 3 mil film was drawn on glass and baked 30 minutes at 150° C. This film showed very good hardness, toughness and flexibility. A similar film was allowed to air dry two days. This film showed very good flexibility.

1.2% (based on resin solids) diethylene triamine was added to a 42.4% solution of the above resin product. A 3 mil film was drawn on glass and baked 30 minutes at 150° C. This film showed very good hardness, toughness, and flexibility. A similar film was allowed to air dry two days. This film also showed very good flexibility.

15% (based on resin solids) urea formaldehyde resin (Beetle 216–8, American Cyanamid Company) was added to a 42.4% solution of the above resin product. A 3 mil film was drawn on glass and baked 30 minutes at 200° C. This film showed very good hardness, toughness, flexibility and color retention.

*Example 17*

In a 3 liter, three necked, round bottom flask equipped with thermometer, agitator and condenser was placed 800 parts of an epoxide resin, having a molecular weight of approximately 613, an average weight per epoxide of 321 and containing an average of 1.95 hydroxyl groups per mol, and 1200 parts (60%) "Sylkyd 50." The reaction mixture was heated 1 hour at 295°–300° F. until the product formed a clear pill on glass. The reaction mixture was run through a filter press.

The reaction product had a weight per epoxide of 906 and a silicon content of 10.68%, and the unaltered product had a viscosity of $Z_2$–$Z_3$ and color of 5.

A sample of the above reaction product was flowed out on bonderized steel and baked 30 minutes at 425° F. A flexible, tack free film was obtained. This film showed good color retention.

*Example 18*

In a 2½ gallon kettle equipped with thermometer, agitator and side arm with well and condenser was placed 2143 parts of a solution of 40% toluene and 60% of an epoxide resin having a molecular weight of approximately 920, and average weight per epoxide of 515 and containing about 3.10 hydroxyl groups per molecule and 857 parts (60%) "Sylkyd 50." The reaction mixture was heated with reflux at 300° F. until the reaction product would form a clear pill on glass. The reaction product had a viscosity of $Z-Z_1$ and a color of 5–6 at 70% solids and a weight per gallon of 8.96.

*Example 19*

In a 5 liter, three necked, round bottom flask equipped with thermometer, agitator and condenser was placed 640 parts of an epoxide resin, having a molecular weight of approximately 2900, and average weight per epoxide of 2000 and containing an average of 10.7 hydroxyl groups per mol, 960 parts (60%) "Sylkyd 50" and 1600 parts cellosolve acetate. The reaction mixture was heated 1½ hours at a temperature of 295°–300° F. At this point the reaction gelled but the gel was dispersed upon reducing the reaction mixture to 39.4% solids with the acetic acid ester of ethylene glycol monoethyl ether, marketed under the trade name Cellosolve Acetate by Carbide and Carbon Chemicals Company. This solution was filtered. The reaction product has a silicon content of 10.51%.

A sample of the above reaction product was flowed out on bonderized steel and baked 30 minutes at 425° F. A hard, flexible film was obtained. This product showed good color retention.

*Example 20*

In a 5 liter, three necked, round bottom flask equipped with thermometer, stirrer and condenser was placed 640 parts of an epoxide resin, having a molecular weight of approximately 3750, an average weight per epoxide of 2780 and containing an average of 15 hydroxyl groups per mol, 960 parts (60%) "Sylkyd 50" and 1600 parts Cellosolve Acetate. The reaction mixture was heated 1 hour at 294°–300° F. At this time the reaction mixture gelled but the gel was dispersed after reduction to 39.3% solids with acetic acid ester of ethylene glycol monoethyl ether, marketed under the trade name Cellosolve Acetate by Carbide and Carbon Chemicals Company. The solution was filtered. The reaction product had a silicon content of 10.28%.

A sample of the above reaction product was flowed out on bonderized steel and baked 30 minutes at 425° F. A hard, flexible film was obtained. This product showed good color retention.

*Example 21*

In a one liter, three necked flask having one neck open and equipped with thermometer and stirrer was placed 52 parts of an epoxide resin having a molecular weight of approximately 466, an average weight per epoxide of 245, and containing about 0.796 hydroxyl groups per molecule, and 210 parts of another epoxide resin, having a molecular weight of approximately 527, an average weight per epoxide of 338, and containing about 2.12 hydroxyl groups per molecule. The resin mixture was heated to 250° F. and 88 parts (25%) "Sylkyd 50" added. The reaction mixture was heated at 290° F. for 3½ hours until the reaction product would form a clear pill on glass. The reaction product was allowed to cool and reduced to 40% solids with a mixture of 60% methyl isobutyl ketone and 40% xylol. Before cooking the above composition was incompatible.

*Example 22*

In a 2½ gallon kettle equipped with a thermometer, agitator, and side arm with condenser and well were placed 375 parts of an epoxide resin, having a molecular weight of approximately 791, an average weight per epoxide of 592, and containing about 3.39 hydroxyl groups per molecule, 905 parts of another epoxide resin, having a molecular weight of approximately 2900, an average weight per epoxide of 2000, and containing about 10.7 hydroxyl groups per molecule, 375 parts (20%) "Sylkyd 50" and 1600 parts Cellosolve Acetate. The reaction mixture was heated at 290° F. until it had a viscosity of W–X, then cooled and thinned to a viscosity of R–S at 40% solids with Cellosolve Acetate. The reaction product had a weight per gallon of 8.79 and an acid value of 0.5.

A film of the above product and 1% (based on solids) benzene phosphinic acid drawn on glass and baked 10 minutes at 450° F. showed a good gloss and cure. A flexible film was obtained.

A white enamel was prepared using the above product. The vehicle had the following composition:

| | Percent |
|---|---|
| Example 23 | 95 |
| Urea-formaldehyde resin | 5 |
| (Based on above solids) tetra ethylene pentamine | 5 |

The vehicle was mixed with a pigment paste containing $TiO_2$.

Films of the above composition were brushed on metal and on wood and allowed to air dry. This composition flowed easily. The panels were tack free in several hours and tough overnight. After 72 hours a tough, hard and glossy surface was obtained. When baked the coating retains its toughness, hardness and glossiness.

I claim:

1. The process for producing siloxane modified polyepoxide resins which comprises reacting by heating a polyepoxide resin which is a member selected from the group consisting of polyglycidyl ethers of polyhydric phenols and polyglycidyl ethers of polyhydric alcohols containing more than one epoxide group and at least one hydroxyl group per molecule and being free from functional groups other than hydroxy groups and epoxide groups with a polyalkoxy siloxane free from functional groups other than alkoxy groups.

2. The process of claim 1 in which the alkoxy groups are methoxy groups.

3. The process of claim 1 in which the polyepoxide resin is a bisphenol-epichlorhydrin epoxide resin.

4. The process of claim 1 in which the reactants are heated until they form a clear pill on glass.

5. The process of producing siloxane modified polyepoxide resins which comprises reacting by heating a polyepoxide resin which is a member selected from the group consisting of polyglycidyl ethers of polyhydric phenols and polyglycidyl ethers of polyhydric alcohols containing more than one epoxide group and at least one containing more than one epoxide group and at least one hydroxyl group per molecule and being free from functional groups other than hydroxyl groups and epoxide groups with an alkoxy polysiloxane containing on the average about three alkoxy groups per molecule and being free from functional groups other than alkoxy groups.

6. The process of producing siloxane modified polyepoxide resins capable of forming films directly from the reaction mixture which comprises reacting by heating a polyepoxide resin which is a member selected from the group consisting of polyglycidyl ethers of polyhydric phenols and polyglycidyl ethers of polyhydric alcohols containing more than one epoxide group and at least one hydroxyl group per molecule and being free from functional groups other than hydroxyl groups and epoxide groups with a polyalkoxy polysiloxane free from functional groups other than alkoxy groups in the proportions of about one mol of polysiloxane for each hydroxyl group of the polyepoxide resin in the presence of a solvent in suitable proportions to permit application of the siloxane modified polyepoxide to a surface.

7. The process of claim 6 in which the siloxane modified polyepoxide resin is coated on a surface and heated to drive off the solvent and bring about a reaction to form a solid insoluble infusible coating.

8. The process of producing siloxane modified polyepoxide resins and converting the same into infusible, insoluble products which comprises reacting by heating a polyepoxide resin which is a member selected from the group consisting of polyglycidyl ethers of polyhydric phenols and polyglycidyl ethers of polyhydric alcohols containing more than one epoxide group and at least one hydroxy group per molecule and being free from functional groups other than hydroxyl groups and epoxide groups with a polyalkoxy polysiloxane free from functional groups other than alkoxy groups, adding a curing agent for the epoxide group to the reaction mixture, and heating the mixture to form a final insoluble, infusible product.

9. The process of claim 8 in which the curing agent is a member of the group consisting of benzene phosphonic acid and benzene phosphinic acid.

10. The process of producing siloxane modified polyepoxide resins which comprises reacting by heating a polyepoxide resin which is a member selected from the group consisting of polyglycidyl ethers of polyhydric phenols and polyglycidyl ethers of polyhydric alcohols containing more than one epoxide group and at least one hydroxyl group per molecule and being free from functional groups other than hydroxyl groups and epoxide groups with a polysiloxane having the general formula:

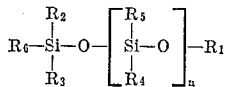

where $n$ is at least 1; $R_1$ is a member of the group consisting of an alkyl and aryl group; $R_2$ is a member of the group consisting of an alkyl and aryl group; $R_3$ and $R_6$ are members of the group consisting of an alkyl, aryl, alkoxy, and aroxy group; $R_4$ is a member of the group consisting of an alkoxy and aroxy group; and $R_5$ is a member of the group consisting of an alkyl, and aryl group.

11. Modified polyepoxide resins which are members of the group consisting of polyglycidyl ethers of polyhydric phenols and polyglycidyl ethers of polyhydric alcohols containing more than one epoxide group and originally at least about one hydroxyl group per molecule and having a member of the group consisting of alkoxy and aroxy polysiloxanes which are free from functional groups other than alkoxy and aroxy groups combined therewith primarily through ether interchange at the hydroxyl groups of the polyepoxide resin and the alkoxy and aroxy groups of the polysiloxane, said modified polyepoxide resins containing more than one unreacted epoxide group.

12. A composition of matter composed of the reaction product of: (A) a resinous epoxide prepared by the reaction of (1) a polyhydric phenol and (2) a compound selected from the group consisting of polyfunctional chlorohydrins and polyepoxides and mixtures thereof, said epoxide resin having an average of at least one OH per molecule, and (B) a member of the group consisting of alkoxy and aroxy siloxanes free from functional groups other than alkoxy and aroxy groups.

References Cited by the Examiner

UNITED STATES PATENTS

| 2,569,920 | 10/51 | Buck et al. | 260—42 |
| 2,695,276 | 11/54 | Hatcher | 260—42 |
| 2,768,150 | 10/56 | Millar et al. | 260—42 |
| 2,843,560 | 7/58 | Mika | 260—42 |

FOREIGN PATENTS 717,408   10/54   Great Britain.

OTHER REFERENCES

Glaser: "Silicon in Protective Coatings," Ind. Eng. Chem., vol. 46, number 11, November 1954, p. 2338.

The Condensed Chemical Dictionary, 5th ed. (1956), Reinhold Pub Corp., New York, page 436.

Turner et al.: "Polyepoxide Resins," Paint Manufacture, September 1956, pages 321–324.

L. J. BERCOVITZ, *Primary Examiner.*

W. G. BENGEL, D. ARNOLD, *Examiners.*